Patented Feb. 27, 1923.

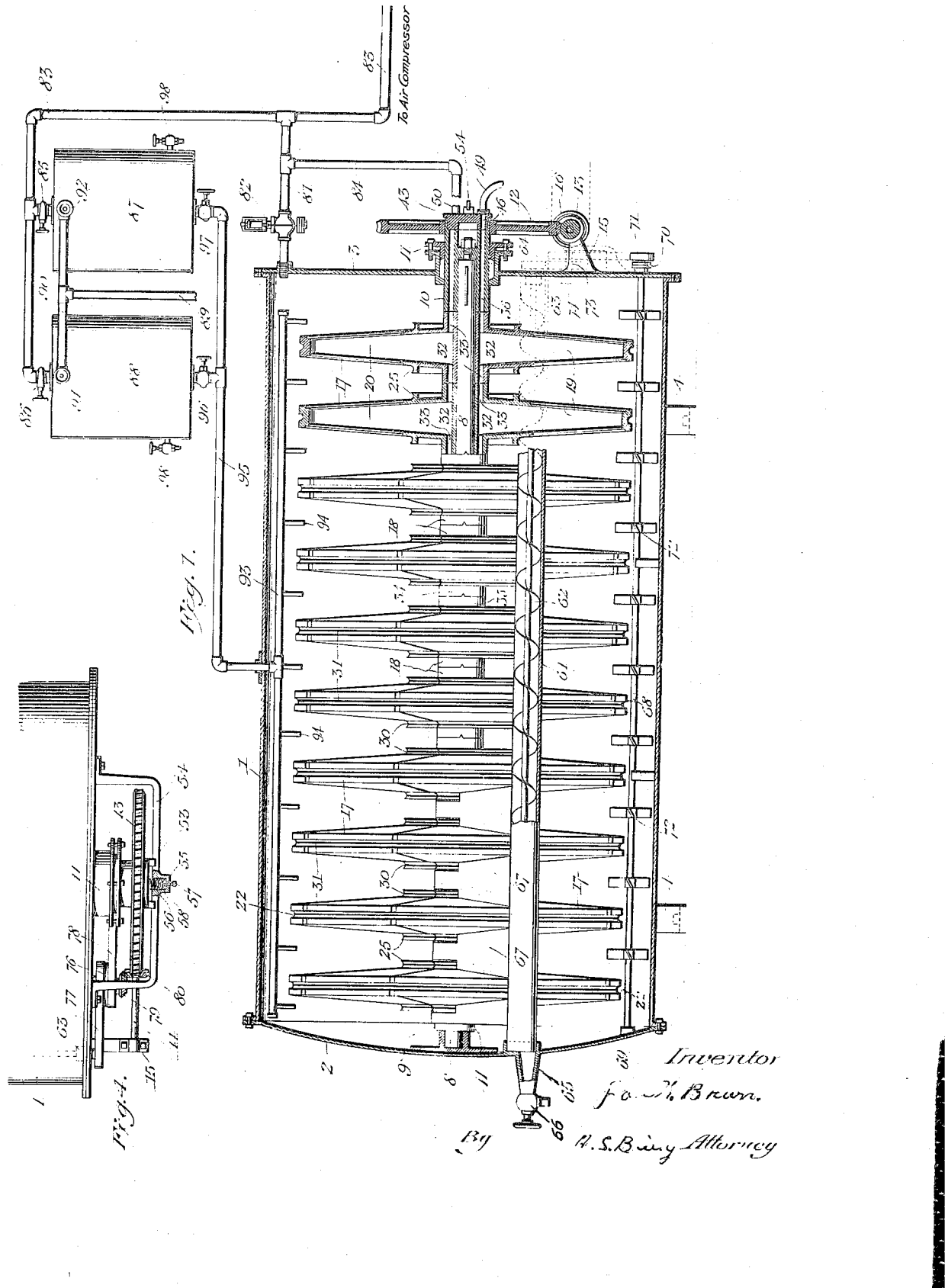

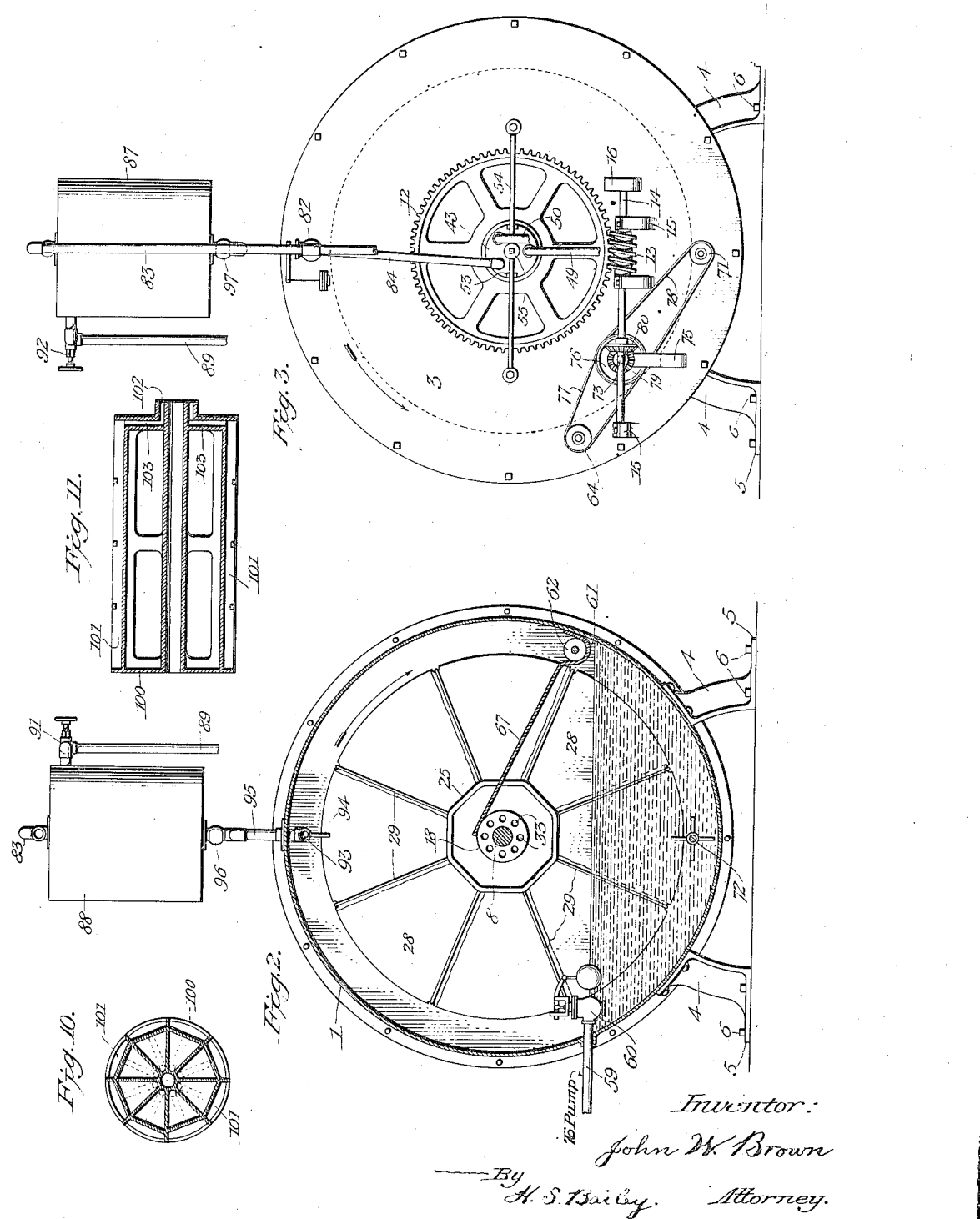

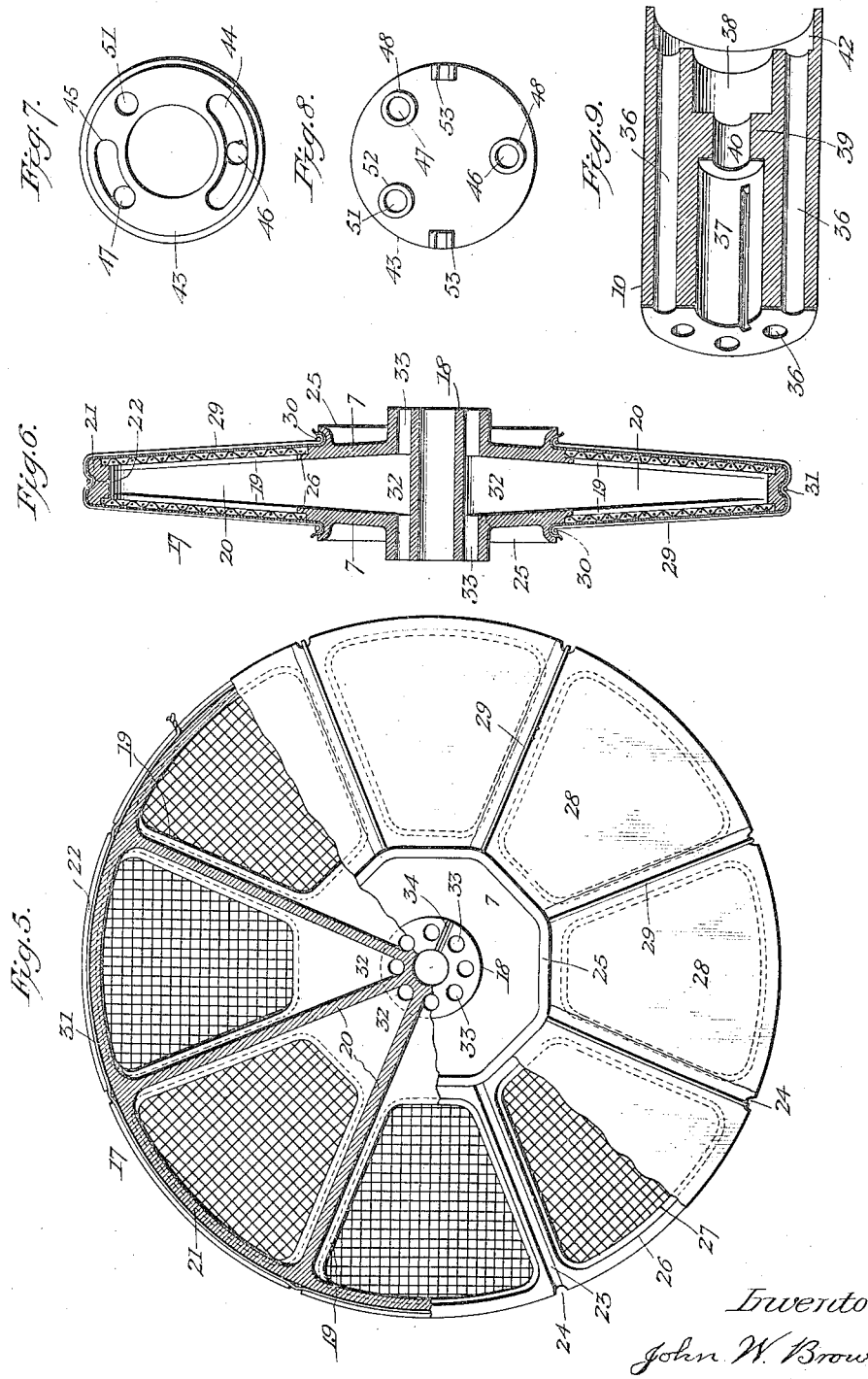

1,446,448

UNITED STATES PATENT OFFICE.

JOHN W. BROWN, OF DENVER, COLORADO.

CONTINUOUSLY-OPERATING AIR-PRESSURE FILTER.

Application filed June 6, 1921. Serial No. 475,295.

*To all whom it may concern:*

Be it known that I, JOHN W. BROWN, a citizen of the United States of America, residing at the city and county of Denver and State of Colorado, have invented new and useful Continuously-Operating Air-Pressure Filters, of which the following is a specification.

My invention relates to a new method and apparatus for an automatically and continuously operating direct air pressure filter for filtering the first carbonation juice in the manufacture of beet sugar and also for filtering other pulp materials.

And the objects of my invention are:

First. To provide a method of forcing, by means of a directly applied automatically controlled and continuously flowing current of compressed air, the carbonated juice through a filtering material and at the same time forming a cake of the precipitated calcium carbonate on the outside surface of the filtering material, and for automatically removing the cake from the filtering material at alternating periods of time.

Second. To provide a continuous air pressure filtering drum in which a direct current of air of sufficient pressure is used to force the juice through a filtering material, and in which a higher pressure of air is used to remove the lime-cake from the filtering material and a mechanism for catching and removing the cake from the filtering drum.

Third. To provide a continuous air pressure filter in which a direct current of air of sufficient pressure is used to force the juice through a filtering material, and in which a higher pressure of air is used to remove the lime-cake from the filtering material than is used to form it on the filtering material; and also to provide means for introducing the pulp into the drum or tank against the air pressure therein, and for discharging the cake from the drum or tank against the pressure therein.

Fourth. To provide a continuous air pressure filter in which a direct current of air of sufficient pressure within the drum is used to force the juice through a filtering material, and in which a higher pressure of air is used to remove the cake from the filtering material than is used to form it on the filtering material; and also to provide means for washing the cake by introducing water into the drum or tank in the form of a spray or drip against the air pressure therein; and to provide means for introducing the pulp into the filtering drum against the pressure therein and for discharging the cake from the drum or tank against the air pressure therein.

Fifth. To provide a continuous air pressure filter in which a direct current of air of sufficient pressure is used to force the juice through a filtering material, and in which a higher pressure of air is used to remove the lime-cake from the filtering material than is used to form it on the filtering material; and also to provide means for washing the cake by introducing water into the drum or tank in the form of a spray or drip against the air pressure therein; and to provide means for introducing the pulp into the filtering drum against the pressure therein and for discharging the cake from the drum or tank against the pressure therein; and to provide means for automatically controlling the two different degrees of air pressure in the drum or tank, and for automatically regulating the inflow of the pulp into the drum or tank, and for maintaining it at a substantially constant level in the tank or drum.

Sixth. To provide an automatically and continuously flowing direct air pressure stationary drum or tank form of filtering apparatus, in which a direct current of air of sufficient pressure within the drum is used to force the juice through a filtering material, and in which a higher pressure of air is used to remove the lime-cake from the filtering material than is used to form it on the filtering material, and to provide a cylinder, the surface of which is divided longitudinally into a number of shallow compartments forming a number of independent filtering units within said filtering drum, and in which a body of pulp is kept in said filtering drum at a uniform level below the axis of said filtering cylinder, and a body of compressed air is kept above the level of the pulp in said drum, and in which means are provided for rotating the filtering cylinder in said drum, so that the independent filtering compartments of said filtering cylinder move through said pulp and said compressed air in the alternate order of their rotation in said filtering drum.

Seventh. To provide an automatically and continuously flowing direct air pressure stationary drum or tank form of filtering apparatus, in which a direct current of air of sufficient pressure within the drum is used to force the juice through a filtering material, and in which a higher pressure of air is used to remove the lime-cake from the filtering material than is used to form it on the filtering material, and to provide a multiple number of independent filtering units within said filtering drum, each of which is of a circular disc shape and contains a number of independent compartments or chambers, and in which a body of pulp is kept in said filtering drum at a uniform level below the axis of said filtering discs, and a body of compressed air is kept above the level of the pulp in said drum, and in which means are provided for rotating and filtering the discs in said drum, so that the independent filtering compartments of said filtering disc units move through the said pulp and through said compressed air in the alternate order of their rotation in said filtering drum.

I attain these objects by the mechanism illustrated in the accompanying drawings, in which:

Figure 1 is a vertical longitudinal sectional view of the improved filtering apparatus.

Fig. 2 is a transverse sectional view through the same.

Fig. 3 is a front elevation thereof.

Fig. 4 is a plan view of the front end portion of the apparatus.

Fig. 5 is a side view, partly in section, of one of the filtering units.

Fig. 6 is a sectional view of the same.

Fig. 7 is a rear side view of the valve for controlling the admission of compressed air to the filter units, and for permitting the escape of liquids from said units.

Fig. 8 is a view of the opposite side thereof.

Fig. 9 is a sectional perspective view of a removable ported hub extension which is secured upon the forward end of the shaft which supports the filter units.

Fig. 10 is a transverse sectional view of a drum form of filter. And

Fig. 11 is a longitudinal sectional view of Figure 10.

Similar letters of reference refer to similar parts throughout the several views.

Referring to the drawings:

The numeral 1, designates the carbonation juice holding tank of the continuous air pressure filter, which is preferably made of iron or steel, and which is of cylindrical shape and is preferably made about six feet in diameter, but may be made in larger or smaller sizes as desired for different materials, and which may be of any length. It is preferably made, however, from $1\frac{1}{2}$ to two times its diameter in length, and is provided with an end 2 which may be secured to or may be formed integral with the tank, and this end is the lime-cake-discharging end of the filter, and with a removable end 3, which is its head end, and it is mounted on and supported by legs 4, the foot portions 5 of which are secured to a floor by lag screws 6.

In the axial center of the tank is rotatably mounted a shaft 8, the rear end of which is mounted in a suitable bearing 9, which may be secured or formed on the inside of the rear end 2. The opposite end of the shaft is provided with a ported extension 10, which extends through a packing box 11, on the head 3, and is provided with a worm gear 12, which meshes with a worm pinion 13, on a shaft 14, which is mounted in bearings 15 on the head 3, the shaft having a pulley 16, which is adapted to be connected with a power source.

Upon the shaft 8, are mounted and secured by any suitable means, a plurality of filtering units or frames 17, each of which consists of a hub portion 18, provided with flanges or heads 7, from which two parallel sets of spokes 19, extend radially from the axial center of said hub. I preferably provide the hubs with eight pairs of these spokes, and the spokes of each pair are connected by a radial web or partition 20, so that the spokes and their webs divide the filter frame or unit into eight separate compartments. The outer ends of the spokes and the webs are also connected by a peripheral rim or band 21, which is formed with an annular groove 22. The outer face of each spoke is also formed with a radial groove 23, which is connected at its outer end with the annular groove 22, by a notch 24, as shown.

The outer face of each flange head 7, is formed with a grooved ridge or lip 25, which conforms to the outline of the said flange head, which is perfectly octagonal.

The marginal edge of the space defined by each two spokes, the rim, and the flange heads 7, is stepped or recessed, as shown at 26, to form a ledge 27, and these ledges support sections of relatively coarse mesh wire screen; eight of such sections being supported on each side of each filter unit, as will be understood by reference to Figures 5 and 6. Thus each one of the eight compartments in each circular filter frame has its opposite sides covered with a section of wire screen cloth that rests on the ledge 27. Each one of the screens on the opposite side of each compartment in each filter frame is covered with a filtering medium or fabric, which filtering medium or fabric is preferably composed of sheets of canvas cut like the screens to fit each compartment between the spokes, and they are secured to the opposite sides of the filter unit, in the following manner:

The required number of tapered sections of a suitable filtering medium 28, such as canvas, is prepared for each filtering unit, each section being long enough to lap over the rim 21, at its outer end, while its inner end lies in the groove of the lip 25, and of a slightly greater width throughout than the distance between each two spokes, so that the tapered edge of each section overlaps the adjacent edge of the succeeding section. The canvas sections on each side of the unit are held in place over the wire screens by yoke shaped wires 29, which are placed over the rim with their legs bearing upon the overlapped edges of the canvas sections, above the grooves 23, in the faces of the spokes, their ends being hooked and resting upon the inner end of the canvas sections which lie in the groove of the lip 25. A wire 30, is passed around the groove in the lip 25, on each side of the unit, so as to engage the hooked ends of all of the wires 29, and the free ends of the wires 30, are twisted so as to tightly clamp the said hooked ends together with the inner ends of the canvas sections, to the lip 25. The outer overlapping ends of the canvas sections are clamped to the rim of the unit, by a wire 31, which is passed around the rim, over the yoke wires 29, its free ends being tightly twisted, thus securely fastening the outer ends of the canvas to the rim, the said ends, together with the adjacent members of the yoke wires 29, being pressed into the annular groove, 22, in the said rim.

The flange heads 7, and partitions 20, form pockets 32, at the inner end of each compartment, and passages 33, extend from these pockets through each end of the hub 18, and the units are positioned upon the shaft 8, so that the passages 33, in all of the hubs will be in alinement, and thus form eight continuous passages through the hubs of all the units mounted on the shaft. In order to aline the passages in the several hubs, to form continuous passages, a notch 34, is formed on one end of each hub, and a projection 35, on the other end thereof, and when the units are placed side by side on the shaft 8, the projection on each hub fits in the notch on the adjoining hub, thus holding the passages in all the hubs in direct alinement.

In order to extend the passages 33, through and beyond the head 3, of the tank, a hub extension 10, is employed, which is keyed upon the forward end portion of the shaft, and extends through the packing box 11, on the said head, as previously mentioned. The hub extension 10, comprises a cylindrical block, which is provided with passages 36, corresponding in number and diameter to the passages 33, in the hubs 18. A bore 37, extends in from one end of the extension to receive the shaft 8, and a bore 38, is formed in its other end, and is separated from the bore 37, by a wall 39, in which a hole 40, is formed, connecting the two bores. A reduced, and threaded end of the shaft, extends through the hole 40, and a nut 41, is screwed upon the said threaded end of the shaft, and against the wall 39, thus forcing the extension 10, against the hub of the first unit, and the hub of each unit against that of the succeeding unit, the hub of the last unit abutting against a collar 41, on the rear end portion of the shaft. The bore 38, is counterbored, as shown at 42, Fig. 9, to receive a stationary disk valve 43, which rests against the end wall of the counterbore, and over the ends of the passages 36.

The inner face of this valve is formed with a segmented chamber 44, of sufficient length and in position to include the three lowermost passages 36, of the extension hub as the same rotates, and also with a segmented chamber 45, of sufficient length and in position to include the uppermost passage 36, and the first passage to the right thereof—looking at the front end of the machine as in Fig. 3. A hole 46, extends from the center of the chamber 44, through the front face of the valve, and a hole 47, extends from the lower end of the chamber 45, through the front face of the valve, and the outer ends of the holes 46, and 47, are surrounded by threaded rims 48, into which the ends of discharge pipes 49, and 50, respectively, are screwed, the purpose of which will be hereinafter explained.

A hole 51, is also formed in the valve 43, and this hole is positioned to register with the first passage on the left side of the uppermost passage 36, as the extension rotates, and the outer end of this hole is surrounded by a threaded rim 52.

The outer face of the valve 43, is formed with diametrically opposite grooved lugs 53, and the longitudinal member of a yoke shaped bar 54, rests in the said grooved lugs, the angled members of the said bar straddling the worm gear 12, and are bolted at their ends to the tank head 3. By this means, the valve 43, is held against rotation, as will be fully understood by reference to Fig. 4.

The bar 54, has a socketed enlargement 55, centrally of its length, in which is housed an expansion coil spring 56, which bears against the valve 43, and thus holds the same in resilient engagement with the end of the extension hub, thus maintaining a tight joint between the parts. The tension of the spring 56, is regulated by a bolt 57, which is screwed through a hole in the end of the enlargement 55, and against a disk 58, which bears against the adjacent end of the said spring.

Ten of the multiple compartment filter units are shown mounted on the shaft 8, but a greater or less number may be used, as conditions may require.

The filter tank 1, is supplied with a mixture of juice and precipitate, by a pipe 59, which enters the tank at the desired level, and the end of this pipe which extends into the tank, is provided with a float valve 60 of common construction, which allows an inflow of mixture until the desired level is reached, when it acts automatically to cut off the supply, thus maintaining the desired depth of mixture in the tank. An air pressure of approximately forty pounds to the square inch is maintained in the tank, as will hereinafter be set forth, and for this reason the pipe 59, is connected with a pump, whereby the mixture is supplied to the tank under a pressure sufficient to overcome that in the tank. The pump is not illustrated, as it may be of any style in common use, and therefore forms no part of the present invention. A trough 61, semi-circular in cross section, extends along one side of the tank, from end to end thereof, and slightly above the level of the liquid. A screw conveyor 62, is supported in this trough, the forward end of whose shaft extends through a packing box 63, on the front head 3 of the tank, and may be provided with either a chain or a belt pulley 64, the latter being shown in the drawings. The head 2, of the tank, is provided with an outlet nozzle 65, in line with the adjacent end of the trough 61, and this nozzle is provided with a valve 66, by which the discharge through the nozzle may be regulated. An inclined scraper 67, is located between each two filter units, and these scrapers are in the form of flat wood or metal plates, the upper ends of which rest upon the hubs of the filter units, while their lower ends connect with the trough 61, as shown in Fig. 2. These scrapers receive the lime-cake from the sides of the filters, and convey it to the trough 61, where it is discharged through the nozzle 65, by the screw conveyor, as will hereinafter more fully appear.

A shaft 68, extends through the tank, beneath the filters, one end of which is supported in a bearing 69, on the head 2, the other end passing through a packing box 70, on the head 3, and may be provided with either a chain or a belt pulley 71, the latter being shown in the drawings. The shaft 68, is provided with a plurality of agitators 72, comprising hubs, which are secured upon said shaft and which are provided with radial blades as shown in Figures 1 and 2, the agitators being positioned between the filters. A shaft 73, is supported at one end in a bearing 74, in the head 3, and at its opposite end in a bracket 75, on the said head, and the shaft carries a pulley 76, which is connected with the pulley 64, on the screw conveyor shaft by a belt 77, and also with the pulley 71, on the agitator shaft, by a belt 78. The shaft 73, is also provided on its outer end with a bevel pinion 79, which meshes with a bevel gear 80, on the driving shaft 14, whereby rotation is imparted both to the screw conveyor and to the agitator.

As before stated, an air pressure of forty pounds to the square inch is maintained in the tank, and the air is admitted through a pipe 81, which is provided with a pressure regulator 82, of any common type. The pipe 81, connects with a pipe 83, which leads to an air compressor, not shown. A pipe 84, connects at one end with the pipe 81, between its connection with the pipe 83, and the pressure regulating valve 82, and the opposite end of this pipe 84, connects with the hole 51, in the valve 43. The pipe 83, which leads from the air compressor, is also connected by valved couplings 85 and 86, with the upper ends of two wash water tanks 87 and 88, respectively, which are supplied from a common water pipe 89, which connects with a cross pipe 90, the opposite ends of which are connected by valved couplings 91 and 92, with the two tanks 87 and 88. A pipe 93, extends along the tank above the filters, and is provided with a plurality of short, depending, spray pipes or nozzles 94, which extend between the filters and are adapted to deliver jets of water under pressure against the opposite sides of the rotating filter. The pipe 93, is connected with a supply pipe 95, which extends up vertically through the wall of the tank 1, and then extends to and beneath the water tanks 87 and 88, and is connected to the bottom of said tanks by valved couplings 96 and 97.

It will be seen from the foregoing that the pipe 83, supplies compressed air to the main tank, to the wash water tanks 87 and 88, and successively to the compartments of the filters. While the pressure in the main tank is forty pounds, the air supplied to the wash water tanks, and to the interior of the filters, must be under greater pressure than the pressure in the tank, or about fifty pounds to the square inch, in order that the wash water may be discharged against the sides of the filters, and that the air entering the part 51, of the valve 43, may pass through the hub passages 33, successively, as the filters rotate, and out through the filtering material of the successive compartments of the filter; a result which could not be accomplished unless the air entering the tank were under a greater pressure than that in the tank.

It is only necessary to use one of the wash water tanks at a time, thus permitting one tank to be filled while the other is being emptied. When the tank 88, is supplying water, the outlet valve 96, is opened to permit the outflow of water, the air valve 86, is also opened to permit compressed air to enter the tank and the outlet water valve 91, is closed to prevent back pressure in the water supply pipe 89. At the same time the air valve 85, is closed to prevent compressed air entering the tank 87, the outlet water valve 97, is closed and the inlet water valve 92, is open to permit the inflow of water to the said tank. Thus each tank is completely cut off from the other during the filling and emptying process. Each tank is provided with an air exhaust valve 98, by means of which the air in the tank to be filled can be discharged before the tank is filled with water.

In operation, a mixture of juice and precipitate is pumped into the tank 1, until the desired depth is reached, when the supply is automatically cut off by the float valve 60. Air under pressure is then admitted to the tank through the pipe 81, the pressure regulating valve 82 being arranged to maintain a pressure in the tank of about forty pounds to the square inch. Power is then applied to the driving shaft 14, and the worm pinion 13 thereon, causes the worm gear 12, to rotate slowly, together with the shaft 8, and the filters mounted thereon. The air pressure on the liquid in the tank forces the same through the filtering material of the submerged portions of the filters, and by reference to Fig. 2 it will be seen that there are always three compartments of each filter which are wholly or partially submerged. The filtered juice after passing through the filtering material on each side of the filters, is forced up into the pockets 32, and out through the lowermost passages 33, of the filter hubs, and through the corresponding passages in the extension 10, to the chamber 44, of valve 43, and thence out through the discharge pipe 49. As the juice is forced through the filters, the precipitate is deposited on the outside of the filter cloth in the form of lime cake, which contains a small percentage of sugar, and this sugar is removed by spraying the cakes with wash water, as the filters revolve, the wash water being directed against the sides of compartments of the several filters by the nozzles 94, as the said compartments reach the highest point in their rotation. This wash water passes through the cake and filter cloth to the uppermost pocket 32, whence it is forced out through the communicating passage 33, in the hubs, and is discharged through a pipe 50, in the valve 43. The chamber 45, in the valve, allows the wash water from each line of compartments, to discharge during two-eighths of the rotary travel of the filters, and the chamber 44, in said valve, permits the filtered juice to discharge from each line of compartments during three-eighths of the rotary travel of the filters, or during the arc traveled by each line of compartments from their entering the juice, until they emerge therefrom, as will be understood by reference to Figure 2. As each passage 33, connecting a line of compartments, registers with the port 51, in the valve 43, compressed air, under a greater pressure than that maintained in the tank, passes into the said passage, from the pipe 84, and into the compartments communicating with said passage, and out through the filter cloth, dislodging the lime-cake therefrom, which drops upon the scrapers 67, which also removes any cake adhering to the filter cloth, as the filter revolves. The cake slides off the scrapers into the trough 61, and is removed therefrom by the screw conveyor 62, which forces it out through the discharge nozzle 65. The valve 66, in this nozzle, is adjusted to retard the discharge of cake sufficiently to insure that the outlet from the tank will at all times be kept closed by the discharging cake, thus preventing the escape of air from the tank with the consequent lowering of the pressure therein.

It will thus be seen that the juice in the tank is filtered, the cake deposited upon the filter cloth is washed, and the cake dislodged from the filter cloth, in the order named, and during the process the juice in the tank is continuously agitated by the agitators 72, as previously described. Any desired method of supporting the wire screens, which support the filter cloths, may be employed, which will prevent them from being forced inward under the pressure in the tank.

In Figures 10 and 11 I have shown a modification in the construction of the filter. In this modification, I employ a cylindrical drum 100, having a plurality of longitudinal compartments 101—preferably eight—which extend the entire length of the drum. The drum is hubbed at one end, and the hub is provided with eight outlet passages 102. This hub abuts against the extension 10, and each compartment 101, is connected by either a pipe or a passage 103, with one of the outlet passages 102, a passage being shown in Fig. 11. The different compartments may be covered with separate wire screens and separate pieces of filter cloth, as in the case of the filters previously described. In other respects, the operation and function of this filter are the same as the filter first described, and while I have illustrated the preferred construction and arrangement of the parts comprising the improved apparatus, it will be understood that I may make various changes in the construction shown, without departing from the spirit of the invention.

Having described my invention, what I claim as new and desire to secure by Letters Patent is:

1. In a filter of the character described, a circular filter unit comprising a hub and a plurality of radial, non-communicating compartments, the sides of which are walled for a short distance from the hub to form pockets at the inner ends of said compartments, and passages leading from said pockets through said hub; coarse mesh screen wire on the open sides of said compartments, filter cloth sections laid over said screen wire, radial yoke-shaped wires extending over said filter cloths, and means for clamping said yoke-shaped wire to said filter to hold said cloths in place.

2. In a filter of the character described, a circular unit, comprising a hub, a rim, and radial spokes connecting the hub and rim, and dividing the unit into non-communicating compartments, the sides of which are closed for a short distance from the hub and open the rest of their areas, a grooved lip extending around each enclosing side portion of said compartments, said rim having an annular groove, said spokes having grooves in their sides extending from the grooved lips and opening into the said annular groove at their outer ends, and stepped recesses being formed in the marginal edges of the open sides of said compartments; coarse wire screen sections which rest in the stepped recesses in each side of said compartments, overlapping sections of filter cloth which are laid over said screen wire, their ends extending over the said rim and into the grooved lips, respectively; yoke-shaped wires which extend over said rim and over said overlapping filter cloths sections above the grooves in said spokes and terminate in hooked ends which rest in said grooved lips, wires which are secured tightly around said grooved lips over the hooked ends of said yokes, and a wire secured tightly around said rim, over the closed ends of said yoke-shaped wires.

3. In a filter of the character described, the combination with a tank, of a shaft rotatably mounted therein, a plurality of hubbed filter units on said shaft, each having radial, non-communicating compartments and passages through the hubs connecting the alined compartments in the several units; a hub extension on the shaft, extending through one end of said tank and having passages registering with those in the hubs, a projection on one face of each hub, engaging a notch on the adjoining face of the adjoining hub, for holding said units in alinement, a reduced, threaded end portion of said shaft, which extends through a wall in said hub extension and a jam nut on said threaded portion which is screwed against said wall, whereby the hubs of the units are held in engagement, a stationary valve in said hub extension, having two outlet ports and an inlet port, which register successively with said hub extension passages, means for admitting air under pressure to said tank and for maintaining a predetermined air pressure therein, whereby liquid in said tank is forced through the successively submerged filter compartments and out through one of the outlet valve ports, means for spraying wash water on the compartments after they emerge from the liquid in the tank, said water passing out through the other outlet valve port, said inlet port being connected with a source of air under greater pressure than that in the tank, whereby such air is admitted successively to the compartments after the wash water treatment, to dislodge precipitate deposited thereon, and means for continuously removing said precipicate from the tank.

4. In a filter of the character described, the combination with a tank, a rotatable filter therein having a hub extension which passes through one end of said tank, radially disposed compartments and passages leading from said compartments through said hub extension, said tank containing a body of liquid to be filtered, of a disk valve in said hub extension having ports adapted to register successively with the passages in the hub extension, as the filter rotates, notched lugs on said valve, a bar which rests in said notched lugs, and having right-angled legs which are bolted to said tank, thereby holding the disk valve stationary, means for admitting air under pressure to said tank, and for maintaining a predetermined pressure therein, whereby filtered liquid is forced out of one of the ports of said valve, means for directing sprays of wash water against the filter compartments after they emerge from the body of liquid, said water passing out through another of said valve ports, means for admitting air under greater pressure than that in the tank, through the remaining valve port, to successively dislodge the cake deposited on said filter compartment, means for continuously removing the cake from the tank, a spring in said bar for exerting a resilient pressure against said valve, and means for regulating the tension of said spring.

5. In a filter of the character described, the combination with a tank, a rotatable filter therein having radially disposed chambers therein, a hub, and passages extending from said chambers through said hub, said hub extending through one end of said tank; and having a circular recess, of a disk valve in said recess, having ports adapted to register with the passages in said hub, grooved lugs on said valve, a bar resting in said grooved lugs, and having legs which are secured to said tank, thereby to hold said valve stationary, and a coil spring in said bar for exerting resilient pressure against said valve.

In testimony whereof I affix my signature in presence of two witnesses.

JOHN W. BROWN.

Witnesses:
G. SARGENT ELLIOTT,
ELIZABETH SMITH.